United States Patent
Ceccherini

[11] 3,979,968
[45] Sept. 14, 1976

[54] SLACK ADJUSTMENT AND TAKE-UP DEVICE FOR KINEMATIC COUPLINGS OF THE RACK AND PINION TYPE

[75] Inventor: Vittorio Ceccherini, Milan, Italy

[73] Assignee: Industria Napoletana Costruzione Autoveicoli Alfa Romeo Alfasud S.p.A., Naples, Italy

[22] Filed: May 21, 1975

[21] Appl. No.: 579,595

[30] Foreign Application Priority Data
June 11, 1974 Italy .................. 23864/74

[52] U.S. Cl. .................. 74/498; 74/409; 74/422
[51] Int. Cl.² .................. B62D 1/20; F16H 55/18; F16H 1/04
[58] Field of Search .............. 74/498, 422, 440, 409

[56] References Cited
UNITED STATES PATENTS

| | | |
|---|---|---|
| 3,630,099 | 12/1971 | Miyoshi .................. 74/498 |
| 3,777,589 | 12/1973 | Adams .................. 74/498 |
| 3,792,624 | 2/1974 | Pitner .................. 74/498 |
| 3,844,181 | 10/1974 | Bayle .................. 74/498 |
| 3,844,182 | 10/1974 | Bradshaw et al. .................. 74/498 |

*Primary Examiner*—Leonard H. Gerin
*Attorney, Agent, or Firm*—Holman & Stern

[57] ABSTRACT

This invention relates to a slack adjustment and take-up device for kinematic couplings of the rack and pinion type, particularly for the steering box of motor vehicles, in which a rotatably supported pinion engages with a rack guided in a translatory manner in the box. The main feature of this invention consists in that a threaded member is screwed into the box to thrust the rack on to the pinion, said threaded member being provided with circumferential markings which form a vernier system with corresponding markings on the box.

4 Claims, 4 Drawing Figures

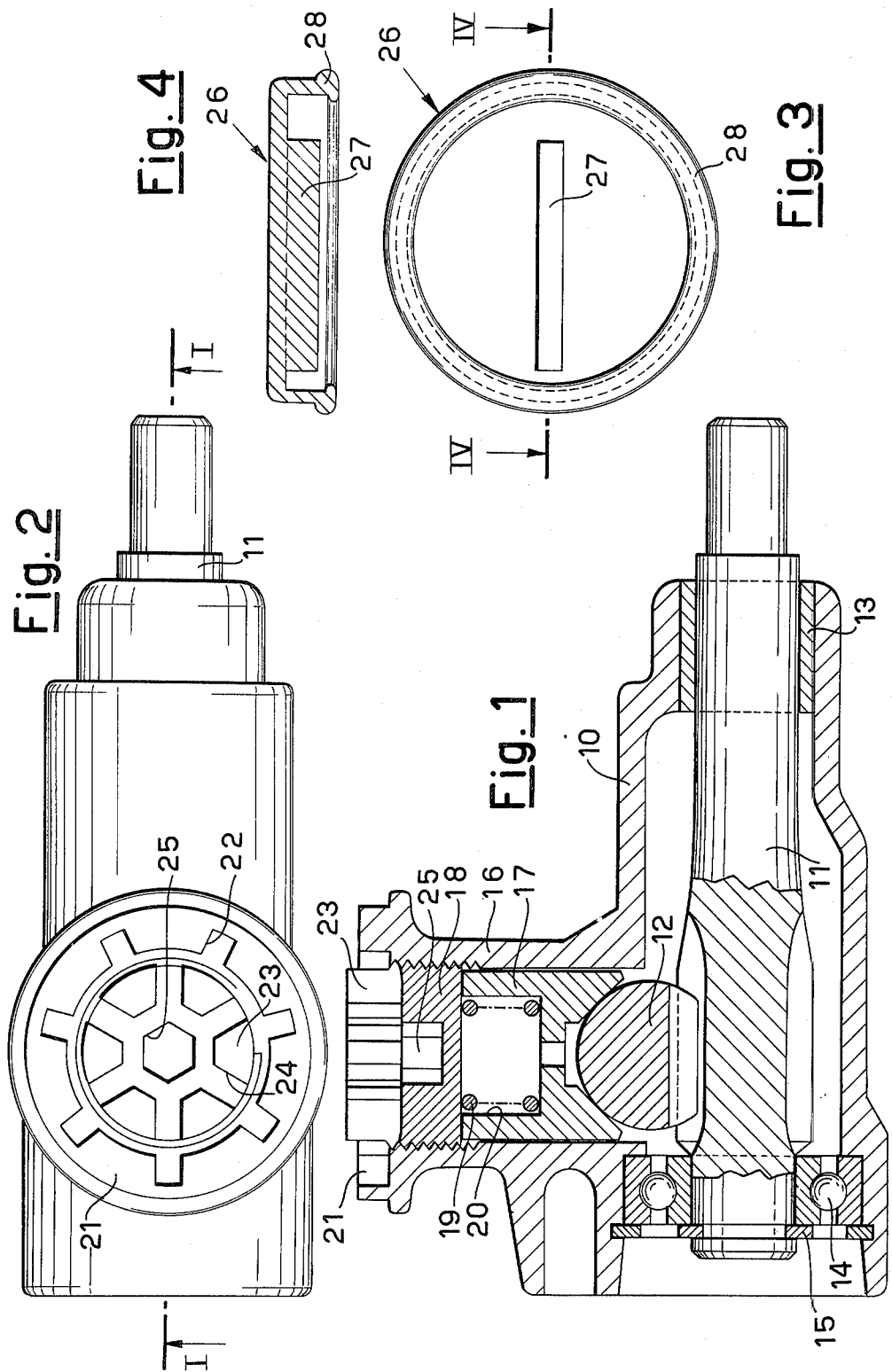

SLACK ADJUSTMENT AND TAKE-UP DEVICE FOR KINEMATIC COUPLINGS OF THE RACK AND PINION TYPE

This invention relates to a slack adjustment and take-up device for kinematic couplings of the rack and pinion type, and in particular for the steering box in motor vehicles.

A perfect kinematic coupling between a rack and pinion, as in the case of all other gears, is impossible to attain, not only because of machining inaccuracies, but also because of wear and physical properties, thermal expansion, intrinsic elasticity etc., of the material used. Thus in order to obtain correct coupling between the rack and pinion, slack is always provided in their mutual engagement to avoid any intermittent jamming, or interference which might cause tooth fracture by excessive stress.

The possible slack provided must evidently be kept within reasonable and often precise limits, so as not to prejudice the continuity of motion and avoid vibration which increases noise and influences the stability of the entire box. In respecting the limits on slack, the material wear must also be taken into account.

To satisfy the requirements of a rack and pinion coupling, it is known to elastically urge the rack in the direction of the pinion axis and limit the elastic excursion by a presser lockable in the steering box in a desired position. It is however not easy with this arrangement to contain the slack between the rack and pinion within adjustable controlled limits.

The object of the invention is to provide a steering box in which it is possible to adjust the slack within determined limits, together with immediate reading of the slack permitted.

This object is attained according to the invention by a slack adjustment and take-up device for kinematic couplings of the rack and pinion type, and in particular for the steering box of motor vehicles, in which a rotatably supported pinion engages with a rack guided in a translatory manner in the box, comprising a threaded member screwed into the box to thrust the rack on to the pinion, and provided with circumferential markings which form a vernier system with corresponding markings on the box.

The vernier system may be provided on the threaded member itself by providing it with an upper crown comprising notches, its position being defined by a corresponding collar on the box comprising a number of notches one greater than the number on the ring.

A cover is also advantageously provided, to lock the adjustment which has been made on the member and to protect the member from the outside.

Further characteristics and details of the invention will be more evident from the description given hereinafter of one of its embodiments, with reference to the figures of the accompanying drawing in which:

FIG. 1 is a section through a steering box incorporating the invention, on the plane I—I of FIG. 2;

FIG. 2 is a view from above of the steering box of FIG. 1;

FIG. 3 is a detail, and

FIG. 4 is a section on the plane IV—IV of FIG. 3.

FIGS. 1 and 2 show a steering box 10 containing a pinion 11 and rack 12.

The pinion 11 is rotatably supported in the box 10 by a friction bearing 13 and a ball bearing 14, located at 15. The pinion 11 engages with the rack 12 guided in the box 10 to translate in a direction perpendicular to the axis of the pinion 11.

The box 10 extends in the form of a lateral bush 16 of axis perpendicular to the axis of the rack 12, its top portion being internally threaded. A block 17 is slidably inserted in the bush 16 and urges the rack 12 in a complementary manner. The block 17 is held in position by a plug 18 screwed into the bush 16 and a spring 19 located between the block and plug and housed in a cavity 20 in the plug 17.

The bush 16 is widened upperly to form a collar 21 with radial notches 22.

The plug 18 comprises upperly a toothed crown 23 with radial notches 24 arranged in such a manner that they can be moved into alignment, one at a time, with any one notch 22 of the collar 21.

The number of notches 22, 24 is chosen in relation to the pitch of the thread of the plug 18, i.e. in relation to the advancement required on screwing or unscrewing the plug 19 between two successive mutual alignments of pairs of notches 22–24. Preferably the number of notches 22 is one greater than the number of notches 24 on the plug 23. In the present case there are seven and six notches respectively.

It is evident that in this manner the advancement of the plug 18 is measured on the basis of a vernier reading, as will be explained further hereinafter.

The plug 18 comprises a central polygonal cavity 25 forming a seat for a suitable operating key, by which it is screwed in or out.

To safeguard the position of the plug 18, as determined by two mutually aligned notches 22–24, and to protect the plug from dust and dirt, a cover 26 is provided from the bottom of which projects a radial rib 27 configured in such a manner that one of its ends is spaced apart from the rim 28 by a distance corresponding to the thickness of the collar 21 at the notches 22, and its other end by a distance corresponding to the thickness of the collar 21 at the solid portions between the notches. In this manner the cover 26 may be engaged with two mutually aligned notches 22–24 and simultaneously protect the plug 18 from external impurities.

The operation of the device according to the invention is as follows:

The plug 18 is screwed in by a suitable key until the rack 12 engages with the pinion 11 without any slack. At this point the plug 18 is screwed out, starting either from an aligned position or from an intermediate position of two corresponding notches 22–24, until the next position of mutual alignment of two corresponding notches is reached. In the first case, i.e. starting from the intermediate position, the tolerance of movement perpendicular to the pinion axis which the rack is allowed to make, i.e. its slack, is less than the advancement obtained by rotation between two successive mutual alignments of two notches 22–24. In the second case, the slack coincides with said advancement. Evidently this tolerance could also be indicated in terms of distance. By knowing the thread pitch of the plug and the product of the number of cavities provided on the collar 21 and on the crown 23, it is easy to calculate the plug advancement between the position without slack and the described position of the rack.

The spring 19 ensures the necessary pressure for continuous engagement between the rack 12 and pinion 11.

When the slack of the rack 12 has been adjusted, the adjustment may be safeguarded by snap mounting the cover 26 on the bush 16, inserting the rib 27 into the two cavities which are aligned after the described adjustment operation. The rib 27 prevents any casual rotation of the plug 18 and thus locks its resilient position. The cover 26 also protects the plug 18, and therefore the entire device, from penetration of dust which would be harmful to the kinematic coupling.

Instead of providing a spring between the plug 18 and block 17, the two elements 17 and 18 may be constructed of a material possessing the necessary yieldability to act in the required resilient manner.

The vernier system may comprise reference notches of any type, and the locking and protection cover may be adapted to whatever system is used.

Finally, the device according to the invention is particularly suitable for taking up slack due to material wear. This constantly ensures controlled precision within the desired limits.

What I claim is:

1. Slack adjustment and take-up device for kinematic couplings of the rack and pinion type, and in particular for the steering box of motor vehicles, in which a rotatably supported pinion engages with a rack guided in a translatory manner in the box, comprising a threaded member screwed into the box to thrust the rack on to the pinion, and provided with circumferential markings which form a vernier system with corresponding markings on the box, said vernier system consisting of a crown comprising notches, provided upperly on the threaded member, and a collar provided at the adjacent zone on the box and comprising a number of notches one greater than the number of notches on the crown.

2. Device as claimed in claim 1, wherein the threaded member may be closed by a cover, from the bottom of which projects a rib designed to engage with two mutually aligned notches of the crown and collar.

3. Device as claimed in claim 1, wherein the rack is urged by elastic means consisting of a spring located between the member and a block which presses against the rack and slides in the box perpendicular to the pinion axis.

4. Device as claimed in claim 10, wherein the rack is resiliently urged by the member and by a pressure block constructed of a material capable of satisfying the resilient requirements.

* * * * *